(12) United States Patent
Peng et al.

(10) Patent No.: US 7,302,853 B2
(45) Date of Patent: *Dec. 4, 2007

(54) SLIDING VIBRATION-RESISTING BUILDING MODEL

(75) Inventors: Sheng-Fu Peng, Tainan (TW); Chun-l Lee, Kaohsiung (TW)

(73) Assignee: National Kaohsiung University of Applied Sciences, Sanmin District, Kaohsiung (TW)

( * ) Notice: Subject to any disclaimer, the term of this patent is extended or adjusted under 35 U.S.C. 154(b) by 326 days.

This patent is subject to a terminal disclaimer.

(21) Appl. No.: 10/965,756

(22) Filed: Oct. 18, 2004

(65) Prior Publication Data

US 2006/0080908 A1   Apr. 20, 2006

(51) Int. Cl.
*G01M 7/02*   (2006.01)
*G09B 9/00*   (2006.01)

(52) U.S. Cl. .................. 73/663; 434/276; 434/365

(58) Field of Classification Search ......... 73/662–665; 434/128, 276, 298–302, 365–366
See application file for complete search history.

(56) References Cited

U.S. PATENT DOCUMENTS 4,112,776 A * 9/1978 Ouellette et al. ............ 73/665
4,343,475 A * 8/1982 Stader ........................ 273/276
4,996,881 A * 3/1991 Tauscher et al. ............. 73/665
5,412,991 A * 5/1995 Hobbs ......................... 73/663
5,526,609 A * 6/1996 Lee et al. ...................... 52/1
5,601,433 A * 2/1997 Potter ....................... 434/130
5,724,893 A * 3/1998 Lee et al. ..................... 108/20
5,804,732 A * 9/1998 Wetzel et al. ................ 73/663

FOREIGN PATENT DOCUMENTS

| JP | 10-37523 | * | 2/1998 |
| JP | 11-161148 | * | 6/1999 |
| JP | 2003-287475 | * | 10/2003 |

* cited by examiner

*Primary Examiner*—Helen Kwok

(57) ABSTRACT

A sliding vibration-resisting building model includes a vibration machine having a vibration table provided thereon with a model base. Two vibration-resisting devices are fixed on the model base, and a model chassis is secured on the two vibration-resisting devices and a model testing structure is assembled on the model chassis. The vibration-resisting devices are able to lower the vibration of the model testing structure when the vibration machine carries out simulating earthquakes and reduce the energy received by the structure, able to elevate the vibration resistant strength of buildings.

1 Claim, 10 Drawing Sheets

SLIDING VIBRATION-RESISTING BUILDING MODEL

BACKGROUND OF THE INVENTION

1. Field of the Invention

This invention relates to a sliding vibration-resisting building model, particularly to one provided with a vibration machine having a vibration table provided thereon with a model base. A vibration-resisting device is assembled on the model base and a model chassis is fixed on the vibration-resisting device and a model testing structure is assembled on the model chassis. The vibration-resisting device is able to lower the vibration of the model testing structure when the vibration machine carries out simulating earthquake, able to lower the energy that a building has to bear and elevate the vibration resisting strength of the building.

2. Description of the Prior Art

Earthquake is one of the most serious natural disasters that endanger lives and buildings, but scientists still cannot predict how great an earthquake may be, and when and where an earthquake may happen. Located at the border between the Eurasia plate and the Philippine Sea plate, Taiwan is frequently endangered by earthquakes, therefore, it is of great importance to try to increase the vibration resisting strength of buildings so as to safeguard lives and properties.

SUMMARY OF THE INVENTION

The objective of the invention is to offer a sliding vibration-resisting building model, able to lower the vibration of a building as well as the energy received by the building to elevate the vibration-resisting strength of the building.

The sliding vibration-resisting building model in the present invention includes a vibration machine, a model base, two sets of vibration-resisting devices, a model chassis and a model testing structure. The vibration machine is provided thereon with a vibration table bored with plural insert holes. The model base assembled on the vibration table is bored with a plurality of fixing holes for locking bolts to be respectively inserted therethrough to fix the model base on the vibration table. The two vibration-resisting devices fixed on the model base are respectively provided with a slide base and a slide rail, with the slide base secured on the model base by locking bolts. The model chassis assembled on the slide rails of the vibration-resisting devices is bored with a plurality of fixing holes for locking bolts to be respectively inserted therethrough and plural insert holes for locking bolts to be inserted therein to fix the model chassis on the slide rails. The model testing structure assembled on the model chassis has its bottom bored with a plurality of insert holes and the topside of its floor provided with a mass block.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
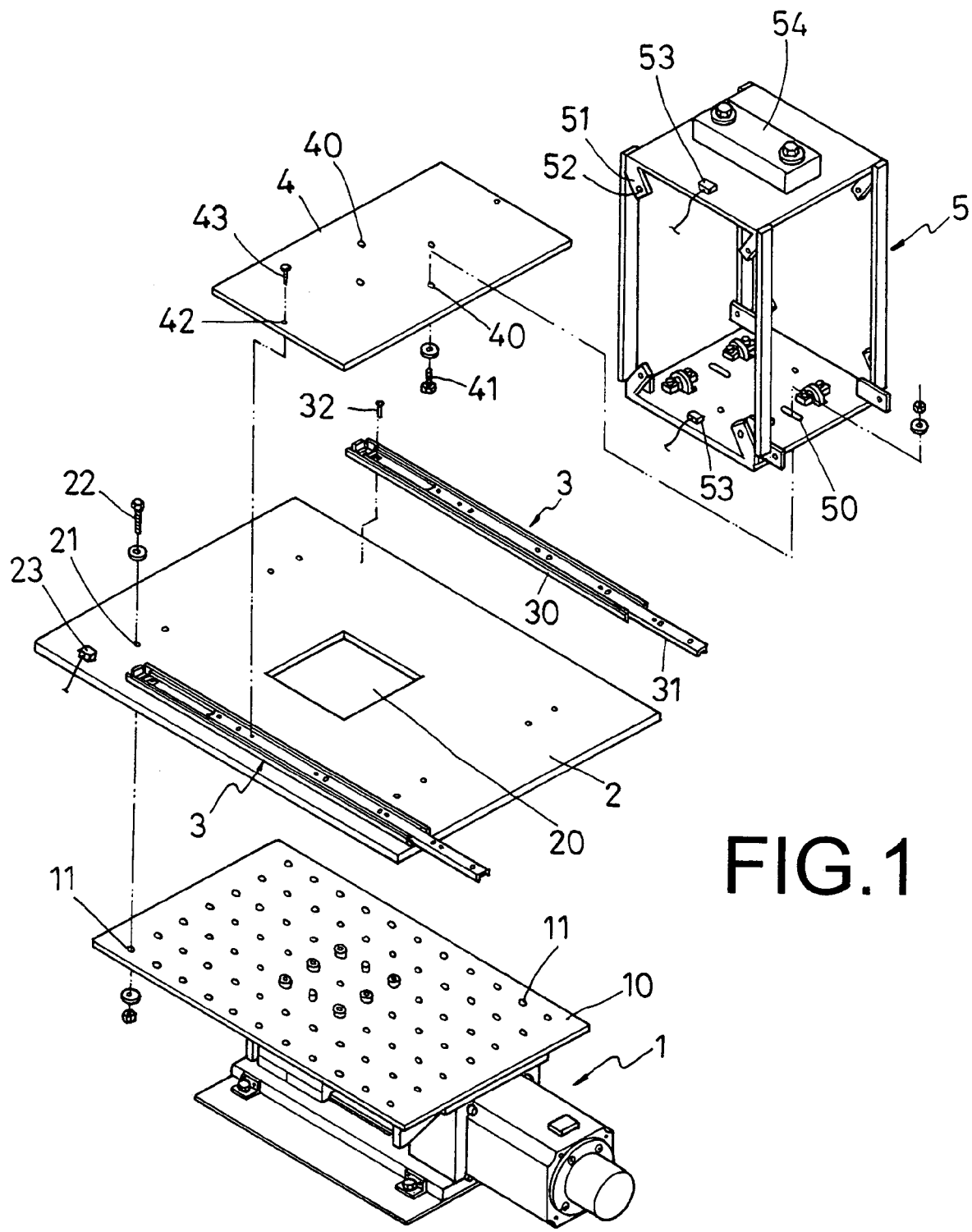
FIG. 1 is an exploded perspective view of a sliding vibration-resisting building model in the present invention.

A preferred embodiment of a sliding vibration-resisting building model in the present invention, as shown in FIG. 1, includes a vibration machine 1, a model base 2, two sets of vibration-resisting devices 3, a model chassis 4 and a model testing structure 5 combined together.

The vibration machine 1 is provided thereon with a vibration table 10 bored with a plurality of insert holes 11.

The model base 2 to be assembled on the vibration table 10 is bored with a through hole 20 in the center and a plurality of fixing holes 21 respectively inserted therein with a locking bolt 22 for fixing the model base 2 on the vibration table 10. The model base 2 is further provided with a detector 23.

The two sets of vibration-obstructing devices 3 to be fixed on the model base 2 are respectively provided with a slide base 30 and a slide rail 31, with the slide bases 30 secured on the model base 2 by locking bolts 32.

The model chassis 4 to be fixed on the slide rails 31 of the vibration-resisting devices 3 is bored with plural fixing holes 40 for locking bolts 41 to be respectively inserted therein and plural insert holes 42 near the opposite sides for locking bolts 43 to be respectively inserted therein to fix the model chassis on the slide rails 31 of the vibration-resisting devices 3.

The model testing structure 5 to be fixed on the model chassis 4 has its bottom bored with a plurality of insert holes 50 for locking bolts 41 to be respectively inserted therein and its sides respectively provided with positioning members 51 respectively having a through hole 52. The topside of each floor of the model testing structure is provided with a detector 53 and a mass block 54, with the detector 53 detecting the velocity value of each floor.

Figure 2:
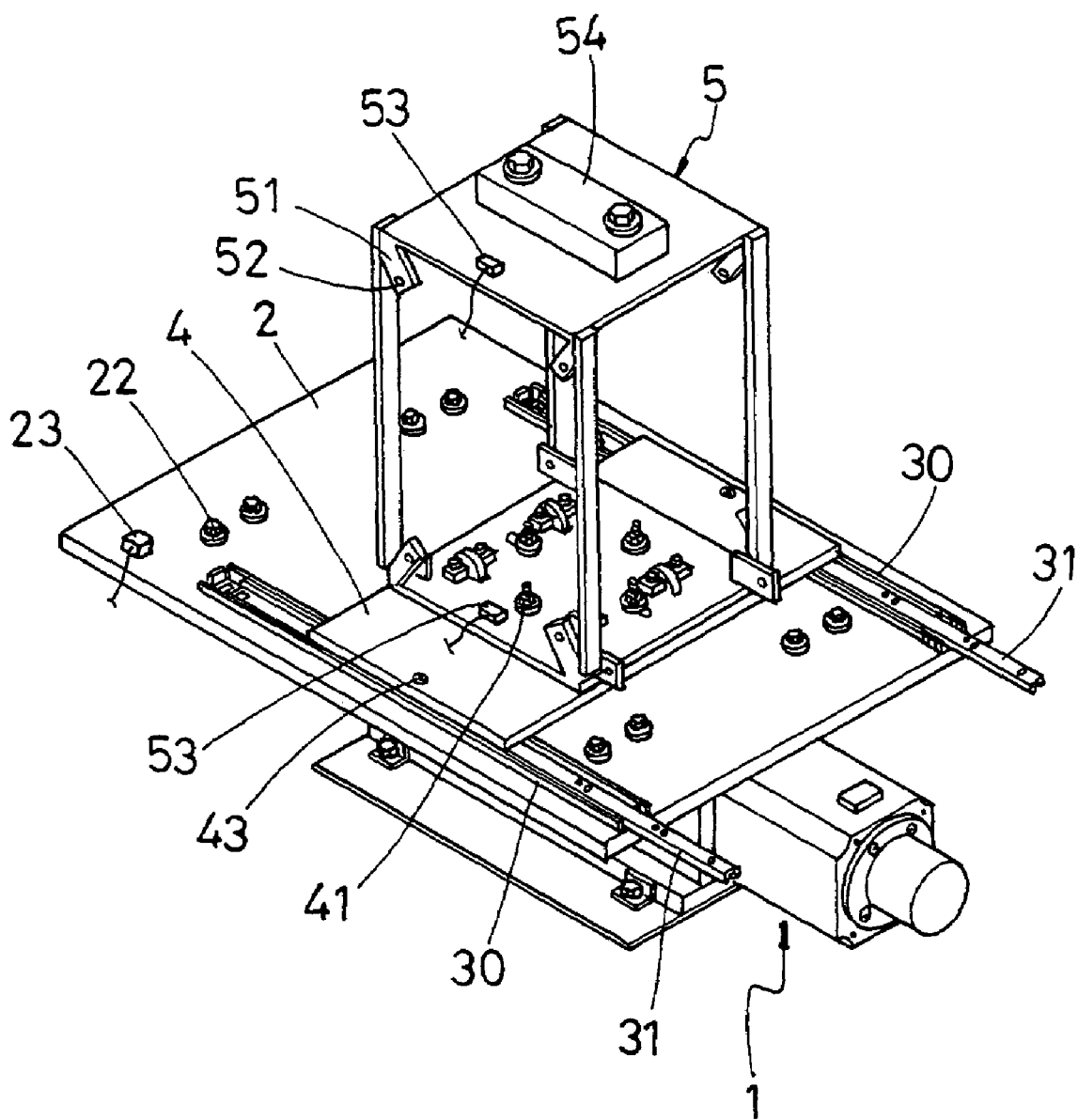
FIG. 2 is a perspective view of the sliding vibration-resisting building model in the present invention.
Figure 3:
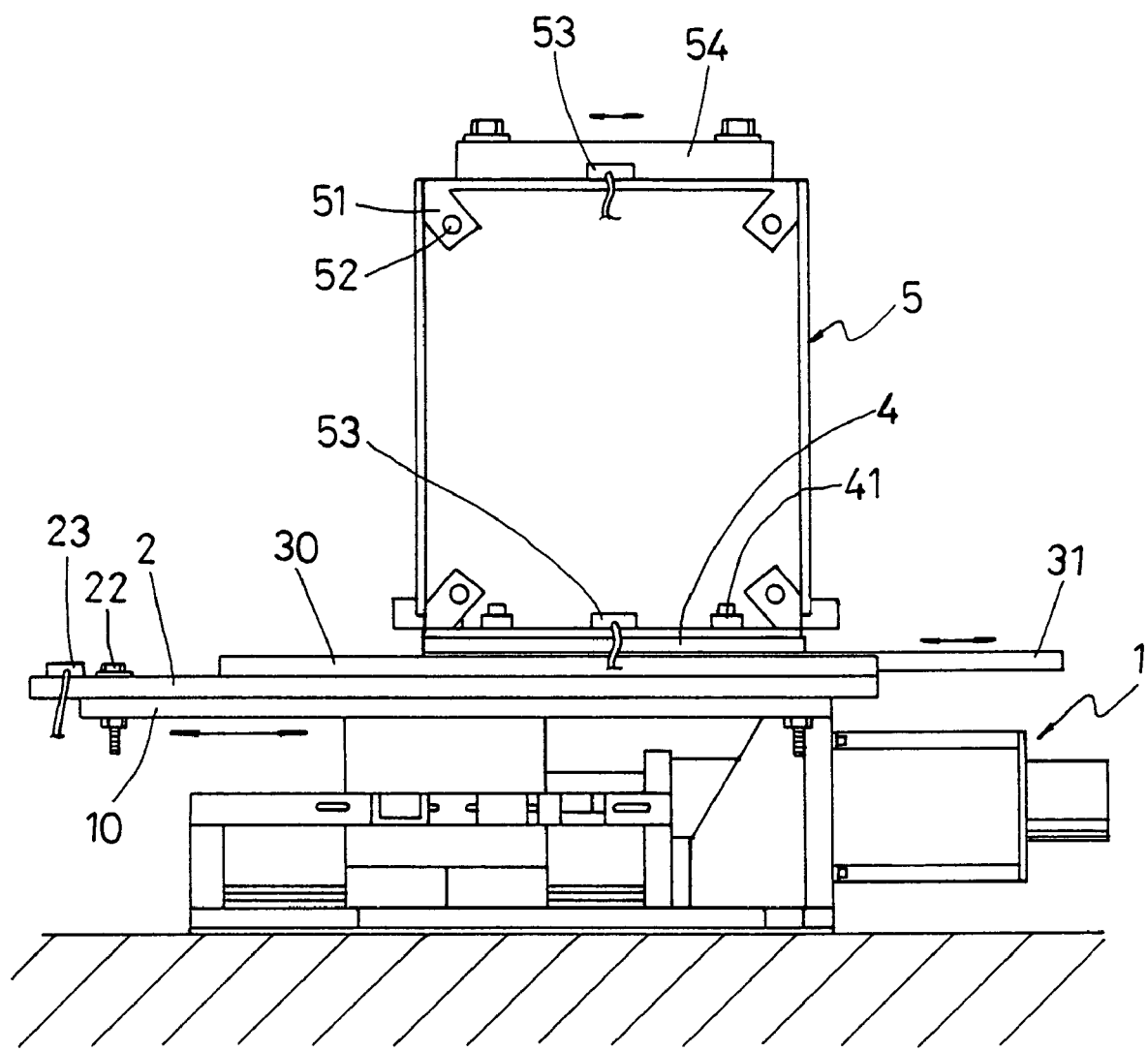
FIG. 3 is a cross-sectional view of the sliding vibration-resisting building model of one floor provided with no oblique supporters in the present invention.

In assembling, as shown in FIGS. 1, 2 and 3, firstly, the slide bases 30 of the vibration-resisting devices 3 are fixed on the model base 2 by the locking bolts 32 and the model chassis 4 is secured on the two slide rails 31 of the vibration-resisting devices 3 by the locking bolts 43. Next, the model base 2 is firmly assembled on the vibration table 10 by the locking bolts 22 respectively inserted through the insert holes 21 of the model base 2 and the insert holes 11 of the vibration table 10. Lastly, the model testing structure 5 is fixedly assembled on the model chassis 4 by the locking bolts 41, and the detectors 53 of the model testing structure 5 and the detectors 23 of the model base 2 are respectively connected to a computer.

Figure 4:
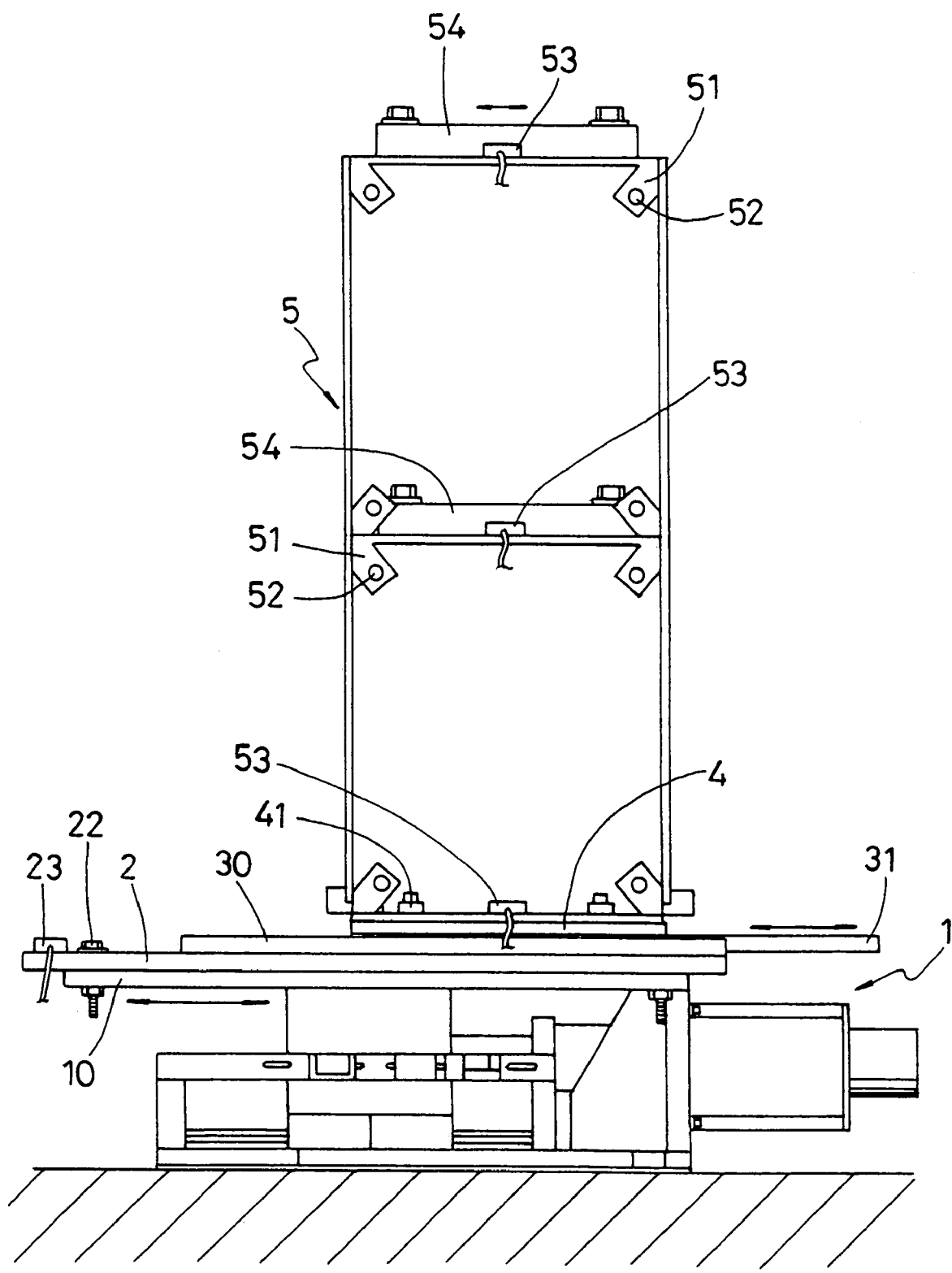
FIG. 4 is a cross-sectional view of the sliding vibration-resisting building model of two floors provided with no oblique supporters in the present invention.
Figure 5:
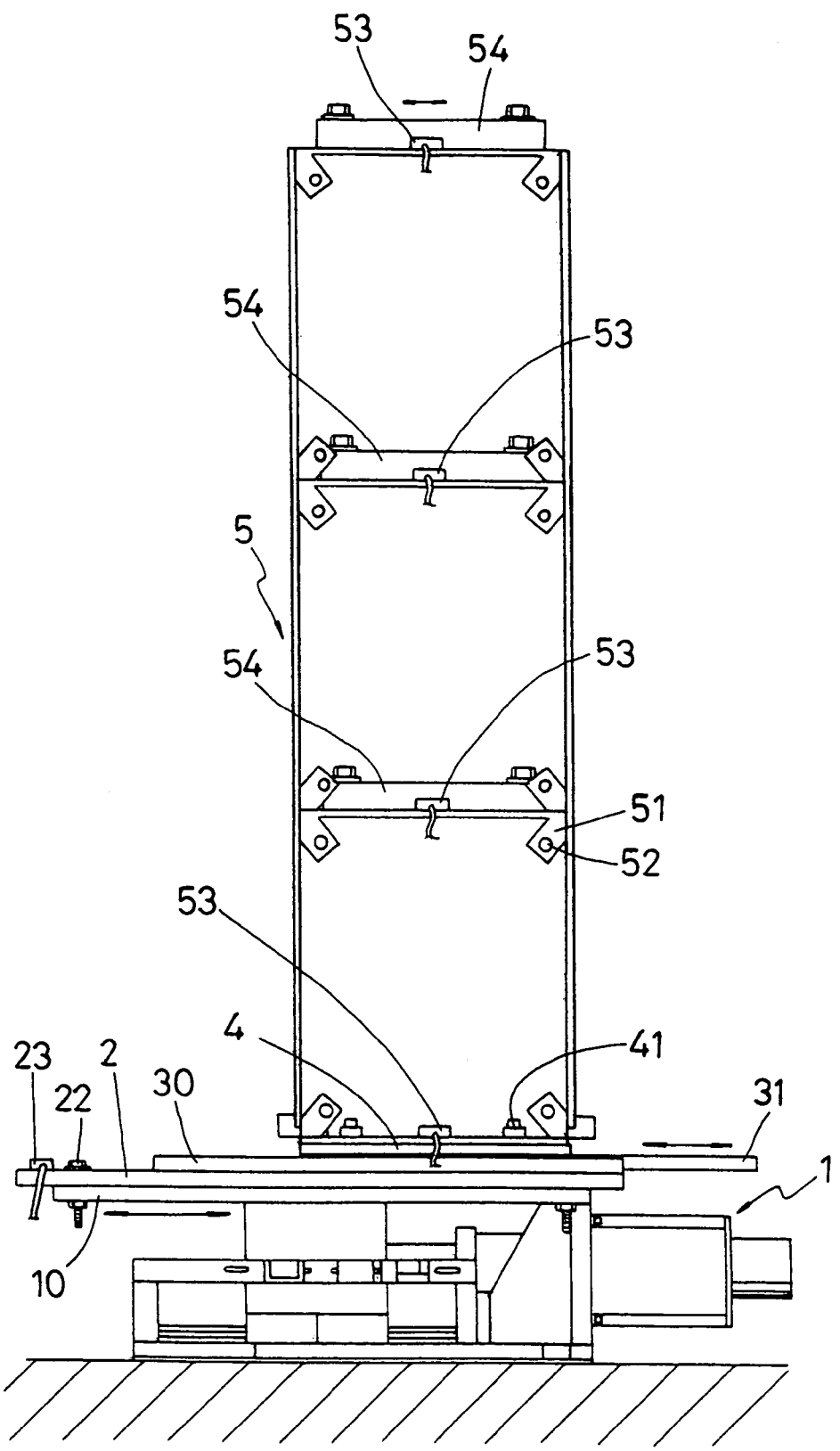
FIG. 5 is a cross-sectional view of the sliding vibration-resisting building model of three floors provided with no oblique supporters in the present invention.

The model testing structure 5 of this invention is designed into three types: the single-floored building, the double-floored building and the three-floored building, as shown in FIGS. 3, 4 and 5, and each floor of the model testing structure 5 is provided with a mass block 54 and a detector 53. To test the vibration-resisting strength of the model testing structure, the total weight of the three types of the model testing structure 5 is respectively 2.45 kg, 4.09 kg and 5.70 kg, and the dimensions of each floor of the model test structure 5 are $15_{cm}$ in length, $15_{cm}$ in width and $25_{cm}$ in height. The model testing structure 5 is made of stainless steel whose cross-sectional size is $1 \times 5_{cm}^2$, and the mass block 54 on the topside of each floor of the model testing structure 5 is 0.925 kg in weight. For testing, the earth's surface acceleration value that the vibration machine 1 inputs is $200_{gal}$, $300_{gal}$, $400_{gal}$ and $500_{gal}$.

During testing, the model testing structure 5 is grouped into three categories: the structure provided with no oblique supporters, the structure having its floors provided with oblique supporters except the first floor and the structure having each floor provided with oblique supporters 6, as shown in FIGS. 3 to 10. The model testing structure 5 is a miniature made of steel, and the position amplitude of earthquake input by the vibration machine 1 is $2_{cm}$, that is, the maximum distance for the vibration table 10 to move leftward and rightward is $2_{cm}$. The number of times of vibration for one round is twenty, but under the same condition, the higher the vibration frequency is, the greater the acceleration may be; therefore, the greatest simulating earth's surface acceleration PGA is $200_{gal}$, $300_{gal}$, $400_{gal}$, $500_{gal}$ and the time for increasing amount is 0.05 second.

Analysis of the result of acceleration for each floor of the three types of model testing structures:

1. The first-typed model testing structure 5 provided with no oblique supporters, as shown in FIGS. 3, 4 and 5:

1-1. Through testing of the vibration machine 1, it is found that if the model testing structure 5 has no vibration-resisting devices 3 provided under the bottom and its foundation is stationary, the condition is that the more the floors of the model testing structure 5 are, the greater the acceleration becomes. During testing, the earth's surface acceleration input for testing is $200_{gal}$, $300_{gal}$, $400_{gal}$ and $500_{gal}$. If the input earth's surface acceleration is $500_{gal}$, a condition of resonance will happen and the model testing structure 5 is unable to bear such excessively great acceleration. Therefore, the earth's surface acceleration input for testing had better not exceed $500_{gal}$ to prevent the model testing structure 5 from damaged.

1-2. If the model testing structure 5 is provided with the vibration-resisting devices 3 under the bottom, the foundation of the model testing structure 5 can slidably move leftward and rightward. Thus, most of the energy imposed on each floor of the model testing structure 5 can be consumed by the vibration-resisting devices 3 and the vibration strength transmitted to the model testing structure 5 will be diminished and also the acceleration of each floor will be lowered. When the input earth's surface acceleration becomes greater and greater, the effect of vibration resisting strength will be more and more evident. When the input earth's surface acceleration is $200_{gal}$, the acceleration almost remains unchanged, but when the acceleration is gradually increases, the effect of vibration resistance becomes manifest, able to effectively resist seismic strength.

Figure 6:
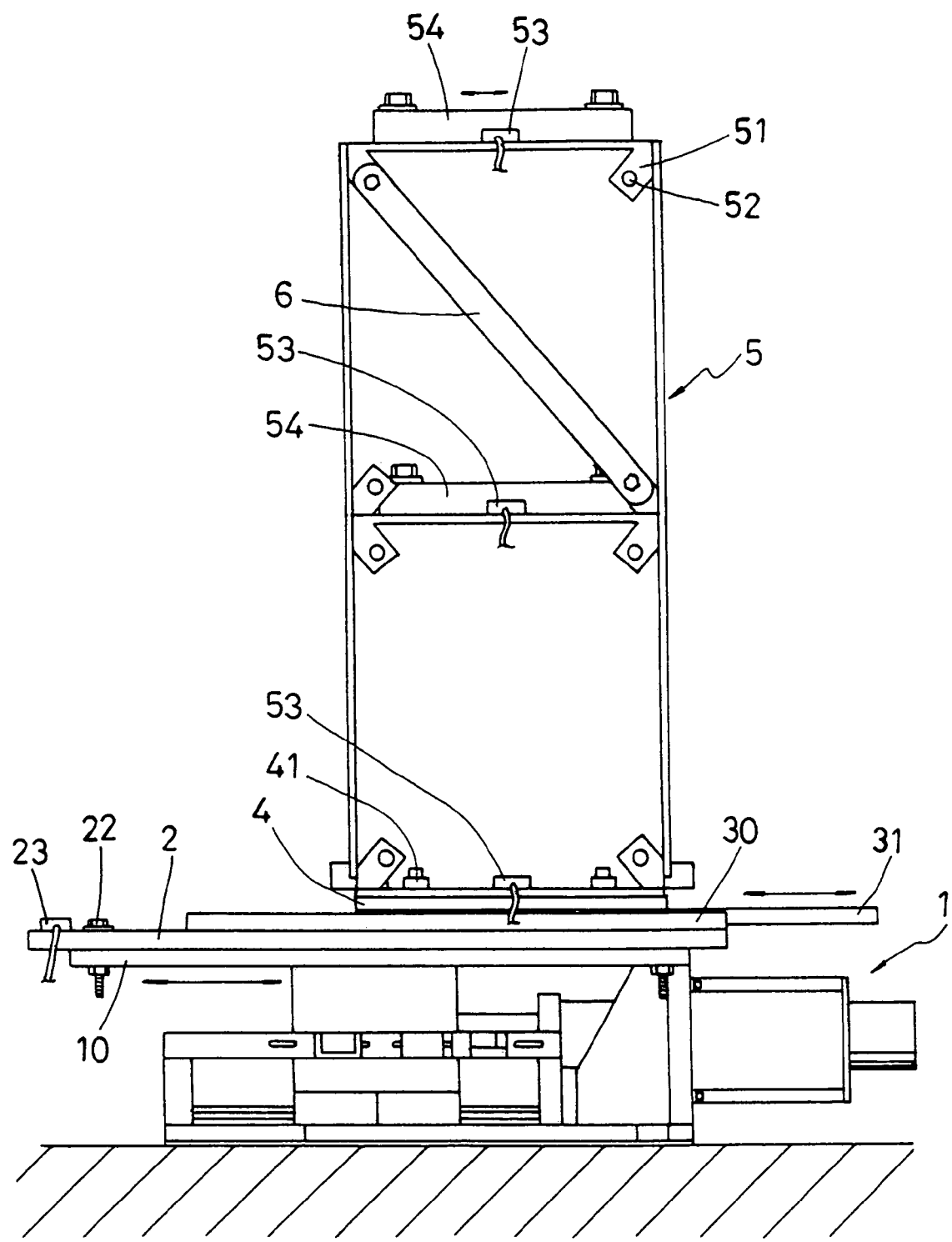
FIG. 6 is a cross-sectional view of the sliding vibration-resisting building model with the first floor without providing oblique supporters but the second provided with oblique supporters in the present invention.
Figure 7:
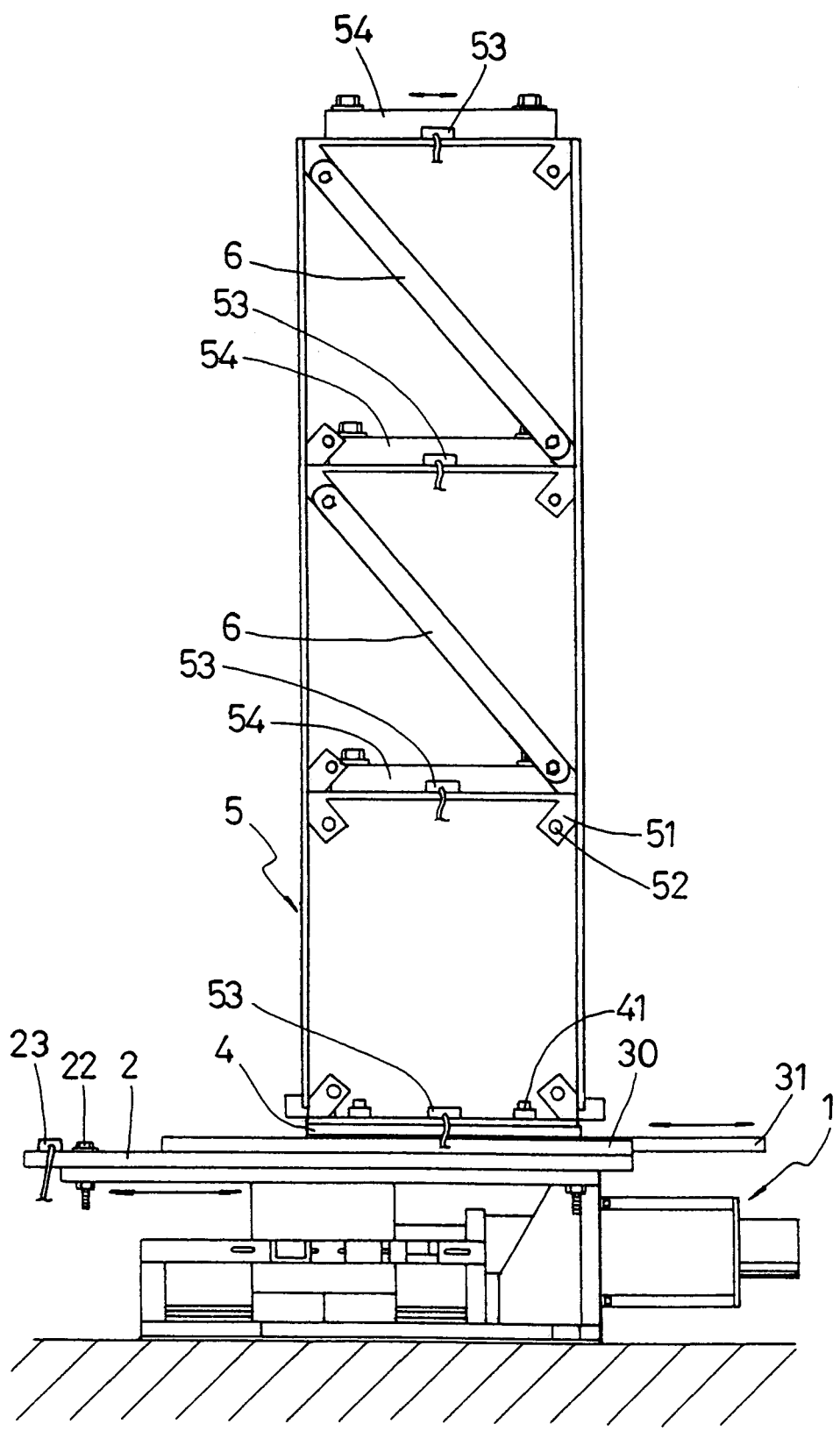
FIG. 7 is a cross-sectional view of the sliding vibration-resisting building model with the first floor without providing oblique supporters but the second and the third floor provided with oblique supporters in the present invention.

2. The second-typed structure is the double-floored and the three-floored model testing structure 5 respectively having the second and the third floor provided with oblique supporters 6, but the first floor is weak, not provided with any oblique supporter 6, as shown in FIGS. 6 and 7.

Through testing, it is found that if the model testing structure 5 has no vibration-resisting devices 3 provided under the bottom and its foundation is stationary, the acceleration of the uppermost floor additionally provided with oblique supporters 6 will be lowered. It is also found that the acceleration of the topsides of the first and the second floor of the double-floored model testing structure 5 is almost the same, and this indicates that the upper half portion of the model testing structure 5 is almost the same as a rigid body in movement and such a result will be equally produced to the three-floored model testing structure 5.

If the vibration-resisting devices 3 is provided under the bottom of the double-floored or the three-floored model testing structure 5, the acceleration of each floor will reduce, and the acceleration of different floors of the model testing structure 5 that has its second and third floor additionally provided with rigid oblique supporters 6 will be lower than that of the model testing structure 5 that is not provided with any oblique supporter 6. Evidently, the vibration-resisting device 3 is able to elevate the effect of vibration resistance.

Figure 8:
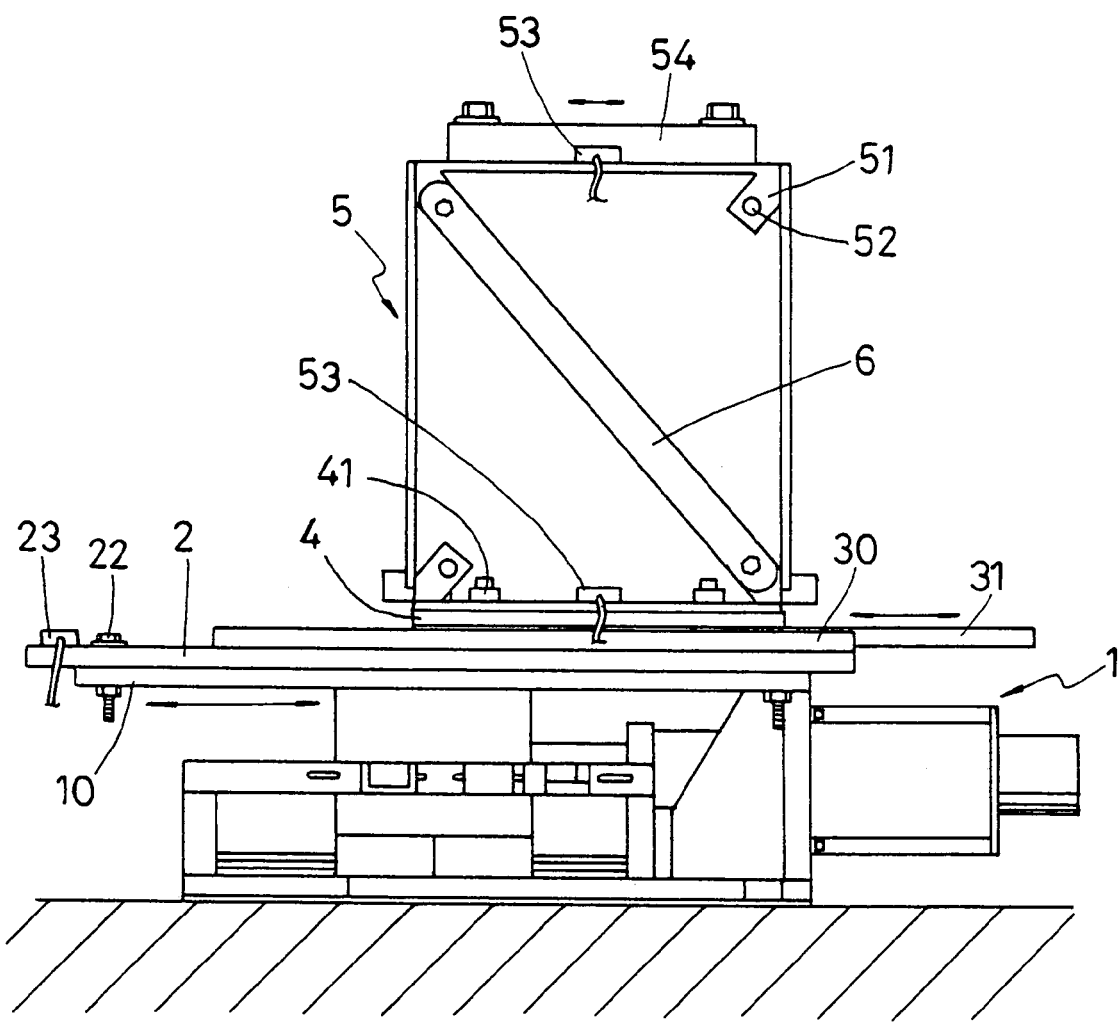
FIG. 8 is a cross-sectional view of the sliding vibration-resisting building model of one floor provided with oblique supporters in the present invention.
Figure 9:
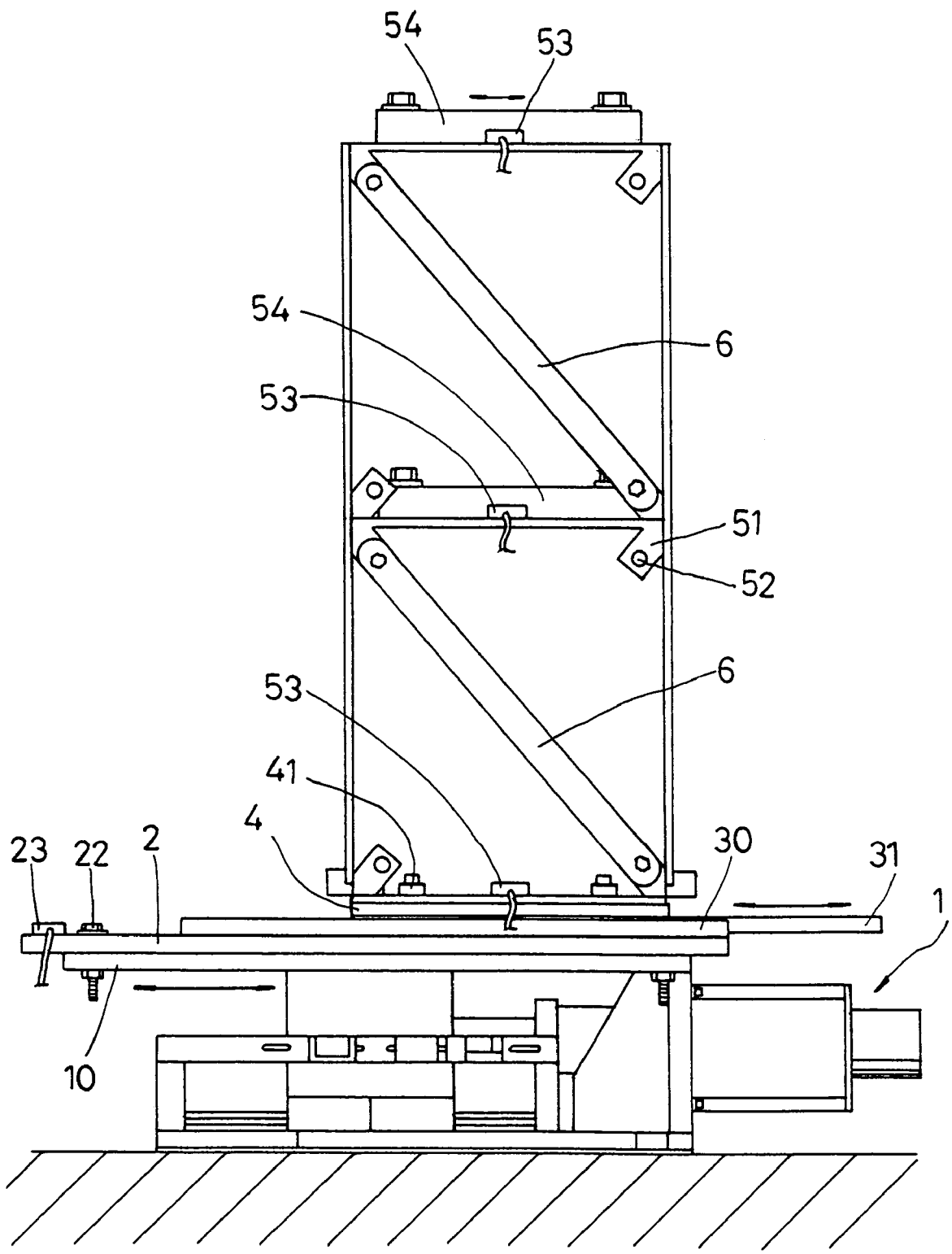
FIG. 9 is a cross-sectional view of the sliding vibration-resisting building model of two floors provided with oblique supporters in the present invention; and, FIG. 10 is a cross-sectional view of the sliding vibration-resisting building model of three floors provided with oblique supporters in the present invention.
Figure 10:
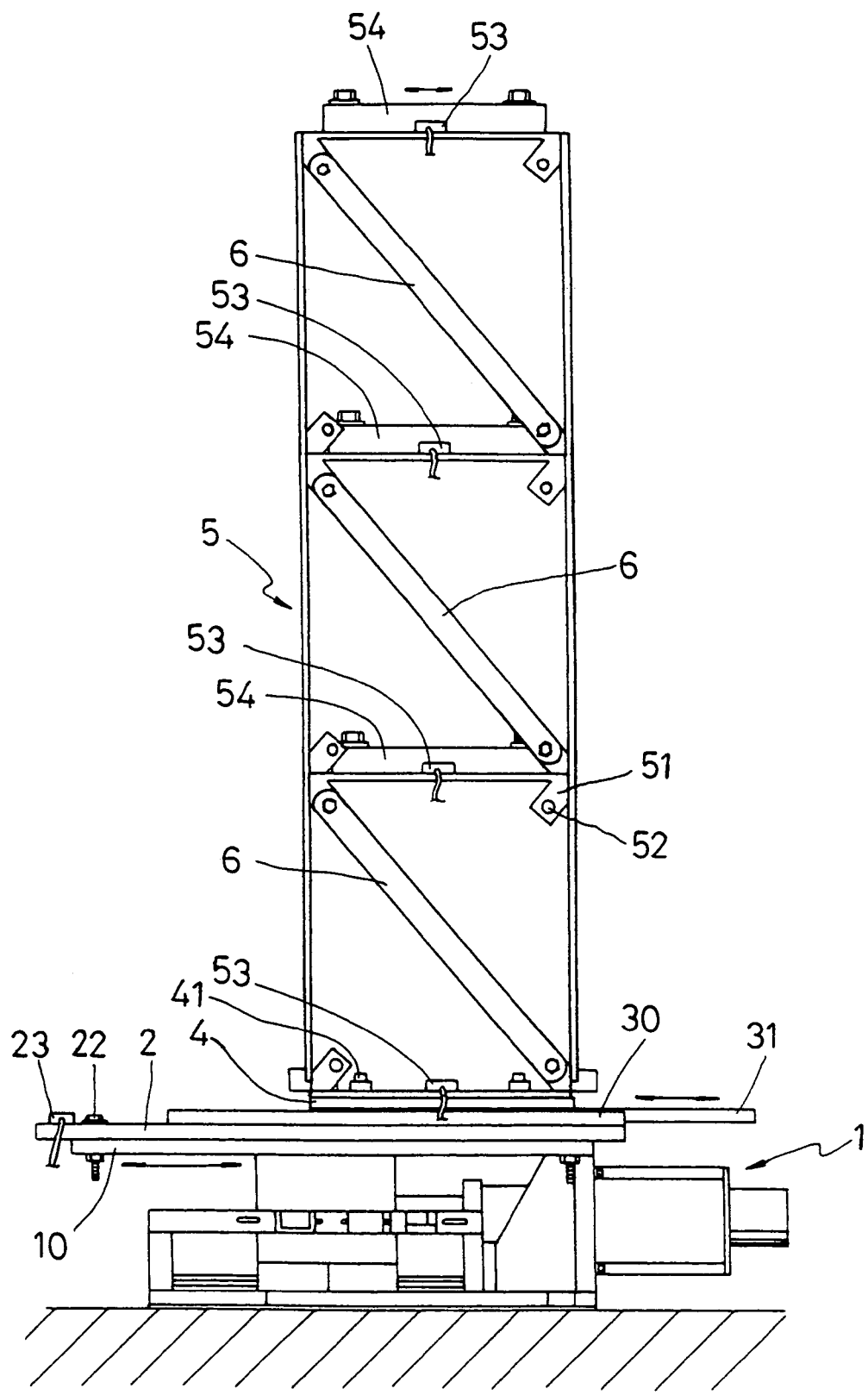

3. The third-typed model testing structure 5 having each floor additionally provided with oblique supporters 6, as shown in FIGS. 8, 9 and 10:

3-1. If the model testing structure 5 is not provided with the vibration-resisting devices 3 under the bottom and its foundation is stationary, it is found that each floor is almost the same as a rigid body in movement and different floors are almost the same in shifting.

3-2. If the model testing structure 5 having all the floors additionally fixed with oblique supporters 6 is provided with the vibration-resisting devices 3 under the bottom, it is found that the acceleration of the topside of the first floor will reduce, and the acceleration of the uppermost floor will be greater than that of the topside of the first floor, but the acceleration of the uppermost floor is greater than that of the topside of the first floor that is not provided with oblique supporters 6. The reason for this condition is that all the oblique supporters 6 of the model testing structure 5 have excessive rigidity without structural flexibility. If the first floor of the model testing structure 5 is not additionally provided with any oblique supporter 6, the rigidity of the structure can be lowered to let the acceleration of the uppermost floor become lower than that of the uppermost floor of the model testing structure 5 that has all the floors additionally provided with oblique supporters 6. In short, the model testing structure 5 having all the floors additionally provided with oblique supporters 6 is almost the same as a rigid structure in movement and its acceleration is only a little greater than that of the first floor that is provided with no oblique supporter 6, but much lower than that of the model testing structure 5 that is provided with no oblique supporters 6 on any floor.

The conclusion of the above-mentioned tests is described below.

1. Through analysis of the result of inputting different earth's surface acceleration, it is found that if the model testing structure of different heights has the vibration-resisting devices provided under the bottom, the greatest acceleration of different-leveled floors is different from each other relative to the differences of acceleration from $200_{gal}$ to $500_{gal}$ input by the vibration table. If the difference between the greatest acceleration value in an accelerating process of the model chassis (the foundation) and the acceleration value of the vibration tabletop is enlarged, it means that the effect of vibration resistance is excellent.

2. When the foundation of the model testing structure of different heights is stationary, the greatest acceleration of different-leveled floors will be in-creased following the increase of the earth's surface acceleration. This condition is especially obvious if the model testing structure is not provided with an oblique supporter.

3. The comparative value of the greatest acceleration of different-leveled floors of the model testing structure: the formula of the comparative value of the greatest acceleration of different-leveled floors of the model testing structure of different heights is: the greatest acceleration of different-leveled floors/the greatest acceleration of the vibration tabletop. If the comparative value is comparatively small, it means that the effect of vibration resistance is excellent. In other words, when the vibration table inputs different earth's surface acceleration beginning from $200_{gal}$ to $500_{gal}$ and the comparative value of the greatest acceleration becomes smaller and smaller, it means that the effect of vibration resistance is excellent.

4. Through comparison of the greatest acceleration value of different-leveled floors of the model testing structure that is not provided with any oblique supporter with the model testing structure that has each floor provided with oblique supporters, it is found that the effect of vibration resistance of different structures is of little difference.

5. As described above, the effect of vibration resistance of different-height model testing structure that is not provided with oblique supporters and the model testing structure that is provided with oblique supporters is of little difference. This is because the lower floors originally has high rigidity and high natural frequency; therefore, the two variables of different heights of floors and oblique supporters have only a little influence on the vibration of the model testing structure that is provided with no oblique supporters.

6. The vibration-resisting devices can greatly lower the acceleration of lower floors and the relative shifting of the floors, able to greatly elevate the vibration resistant strength of buildings.

7. The vibration-resisting devices are able to reinforce the buildings that have comparatively poor vibration resistant strength, able to be applied for the reinforcement of old ancient remains.

8. The foundation cutting force imposed upon an effective vibration-resisting device is lower than that imposed upon a conventional stationary foundation, and the requirement of the greatest curved tenacity of the model testing structure on the vibration-resisting device is also lower than that of the conventional structure. It can be said that the vibration-resisting device only functions in a range of linear elasticity but keeps its non-linear capability unemployed. Therefore, the curved tenacity of the components of the vibration-resisting device will be able to produce a marked effect when a tremendous earthquake happens, only it is necessary to pay attention to the allowable maximum transfiguring of the vibration-resisting structure. In addition, if the cross-sectional property of the vibration-resisting device can be lowered, the model testing structure on the vibration-resisting device can also produce non-linear movement to avoid being damaged when the vibration-resisting device bears a greatest seismic force designed for testing, thus achieving economic effect and ensuring safety of buildings.

9. The frictional coefficient of the vibration-resisting device is preferably small to let the structure system recover it original position easily and reduce swing of the floors of a building during vibration of an earthquake.

While the preferred embedment of the invention has been described above, it will be recognized and understood that various modifications may be made therein and the appended claims are intended to cover all such modifications that may fall within the spirit and scope of the invention.

What is claimed is:

1. A sliding vibration-resisting building model comprising a vibration machine, said vibration machine provided thereon with a vibration table bored with a plurality of insert holes, a model base assembled on said vibration table, said model base bored with plural fixing holes respectively having a locking bolt inserted therein, said model base fixed on said vibration table by said locking bolts, two vibration-resisting devices secured on said model base, each said vibration-resisting device provided with a slide base and two slide rails at an upper side of the slide base, said slide base fixed on said model base by locking bolts, a model chassis fixed on said slide rails of said vibration-resisting devices, said model chassis bored with plural fixing holes for locking bolts to be respectively inserted therein, said model chassis further bored with plural insert holes for locking bolts to be inserted therethrough, said model chassis secured on said slide rails of said vibration-resisting devices by said locking bolts, a model testing structure assembled on said model chassis, said model testing structure having a bottom; the bottom being bored with plural insert holes, said model testing structure 5 having each floor provided with a mass block;

wherein sides of said model testing structure are provided with positioning members respectively; each positioning member has a through hole for fitting oblique supporters; and wherein said model base and each floor of said model testing structure are respectively provided with a detector for measuring a velocity value of each floor of said model testing structure.

\* \* \* \* \*